United States Patent [19]

Stanuch

[11] Patent Number: 4,511,880
[45] Date of Patent: Apr. 16, 1985

[54] TWIN OSCILLATING LIGHT

[75] Inventor: Edward S. Stanuch, Oak Forest, Ill.

[73] Assignee: Federal Signal Corporation, Oak Brook, Ill.

[21] Appl. No.: 426,990

[22] Filed: Sep. 29, 1982

[51] Int. Cl.³ ............................................. B60Q 1/00
[52] U.S. Cl. ........................................ 340/84; 340/50; 340/81 R; 340/83; 350/99; 362/35; 362/170
[58] Field of Search ...................... 340/84, 87, 90, 50, 340/81 R, 82, 83, 321, 331, 332; 362/35, 157, 170; 350/99, 100, 288, 289, 302

[56] References Cited

U.S. PATENT DOCUMENTS

| | | | |
|---|---|---|---|
| 2,510,892 | 6/1950 | Kennelly | 340/50 |
| 3,309,661 | 3/1967 | Kennelly | 340/50 |
| 4,004,274 | 1/1977 | Menke et al. | 340/50 |

Primary Examiner—Donnie L. Crosland
Attorney, Agent, or Firm—Charles F. Pigott, Jr.

[57] ABSTRACT

A twin oscillating light assembly for use on police cars, ambulances and other emergency vehicles on which a warning light is required, the light assembly includes two light sources which each oscillate both vertically and horizontally and together produce an X-pattern of light especially useful in clearing the right-of-way ahead of a vehicle on which the light is mounted.

10 Claims, 3 Drawing Figures

TWIN OSCILLATING LIGHT

BRIEF SUMMARY OF THE INVENTION

The present invention relates to a twin oscillating light for use on various types of emergency vehicles such as police cars, fire trucks and ambulances, and is primarily intended to the purpose of clearing the right-of-way ahead of the vehicle.

It is known to utilize a single oscillating light which produces a figure-eight pattern of light or a pattern of light resembling a sine wave. Prior patents disclosing such oscillating lights are U.S. Pat. Nos. 2,409,046, 2,446,333, 2,455,497, 2,456,287, 2,464,318, and 2,510,892. The present invention comprises an improved oscillating light assembly including a pair of synchronized light sources which each oscillate about both a vertical axis and a horizontal axis and together produce an X-pattern of light found to be especially effective for the intended purpose of clearing the right-of-way for an emergency vehicle.

It is therefore a general object of the present invention to provide an oscillating light assembly which produces an X-pattern of light through utilization of a pair of synchronized oscillating light sources.

Another object of my invention is to provide an improved machanism for producing an X-pattern of light as last above-mentioned, which mechanism provides for both vertical and horizontal oscillation of two synchronized light sources and can be readily modified to vary the amplitude of either the horizontal or the vertical oscillation.

A further one of my objects is to provide an improved light assembly as described above which utilizes a gear assembly that is easily assembled and minimizes tolerance problems.

The foregoing and other objects and advantages of the invention will be apparent from the following description of a preferred embodiment, taken in conjunction with the accompanying drawings.

Figure 1:
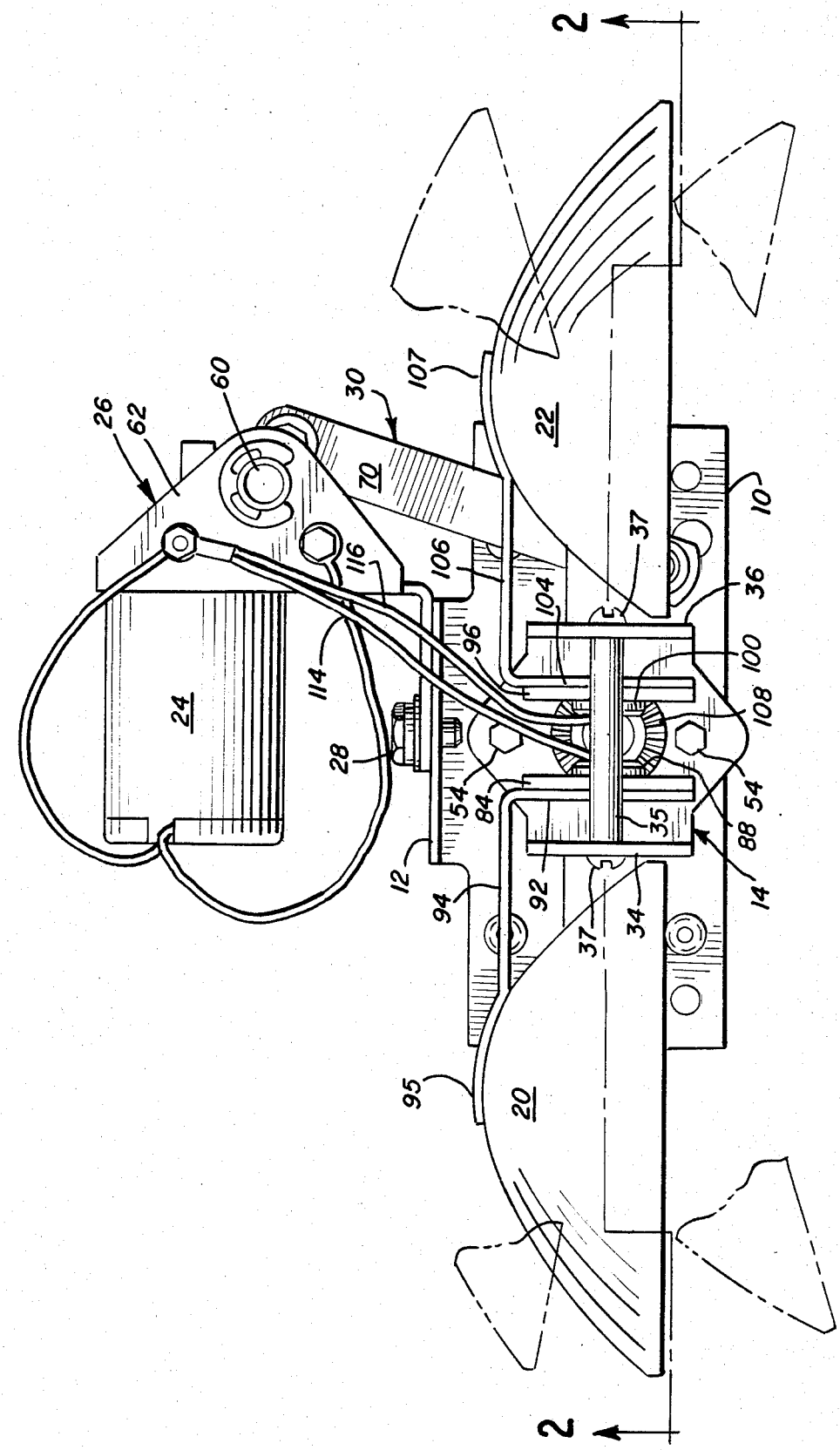
FIG. 1 is a top plan view of a light assembly, constructed in accordance with the present invention, showing by means of dash lines different horizontal positions of two light reflectors.

Now, in order to acquaint those skilled in the art with the manner of making and using my invention, I shall describe, in conjunction with the accompanying drawings, a preferred embodiment of the invention.

DETAILED DESCRIPTION OF THE INVENTION

Referring now to the drawings, there is shown a light assembly including a base plate 10 having an integral upright backplate portion 12, and a U-shaped bracket 14 which pivots about a vertical axis and carries a pair of light sources comprising lamps 16 and 18 and reflectors 20 and 22. A permanent magnet motor 24 is supported on a motor mounting bracket 26 which is bolted to the backplate 12 by bolts 28.

As will be explained more fully hereinafter, the motor 24 drives a crank assembly 30 which causes the U-shaped bracket 14 and the light sources mounted thereon to oscillate back and forth about a vertical axis. In addition, a gear assembly 32 causes each of the reflectors 20 and 22 to oscillate vertically about a horizontal axis during the foregoing oscillation about a vertical axis.

The U-shaped bracket 14 includes a pair of upright parallel plate portions 34 and 36 integral with a horizontal base portion 38. A cylindrical spacer member 35 extends between the two upright plate members 34 and 36 and is secured at its ends by screws 37. The U-shaped bracket 14 includes an aperture 40 in the base portion 38 to permit the bracket to mount over the top of a crank member 42 (see FIG. 2) including a sleeve portion 44 and a crank arm 46 having a lug 48. The sleeve 44 is mounted over a fixed shaft 50 the lower end of which is fixedly supported from the baseplate 10 by a pair of nuts 52. The base 38 of the U-shaped bracket 14 is fixed to the crank member 42 by a pair of screws 54 (see FIG. 1) which engage into lug portions integral with sleeve 44. The U-shaped bracket 14 and crank member 42 are thus secured together for conjoint rotation about the vertical axis of fixed shaft 50.

Figure 3:
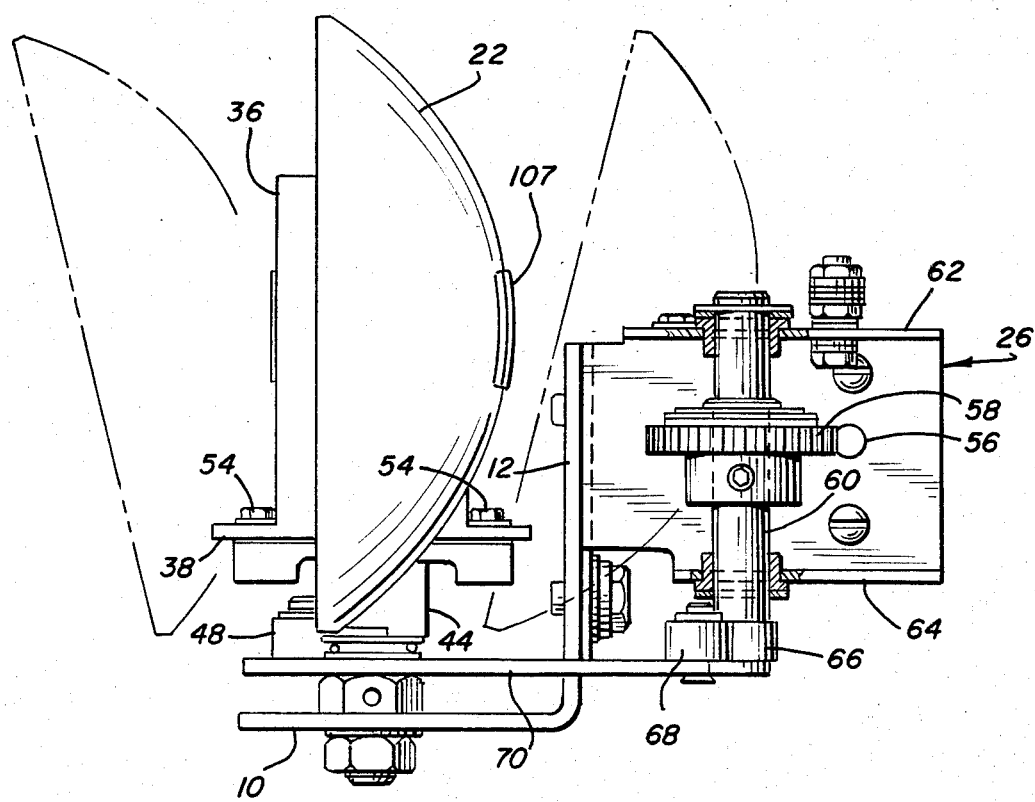
FIG. 3 is a side elevational view of the light assembly of FIG. 1, showing by dash lines different vertical positions of the light reflectors.

As best shown in FIG. 3, the motor 24 includes an output worm 56 which meshes with a worm gear 58 fixedly mounted on an upright shaft 60 having its upper and lower ends journalled for rotation in upper and lower horizontal plate portions 62 and 64 which form part of the motor mounting bracket 26.

The lower end of the vertical shaft 60 projects beneath the fixed plate portion 64 and has a crank fixedly mounted thereon, one end 66 of the crank being mounted on the shaft 60 and the other end 68 being secured to one end of a link 70. The other end of the link 70 is secured to lug 48 of crank member 42. In the foregoing manner, motor 24 through worm 56 drives worm gear 58 thereby rotating vertical shaft 60 and crank 66. Rotation of crank 66 about the axis of shaft 60 operates through link 70 to alternately push and pull crank arm 46 thereby oscillating crank member 42 back and forth on shaft 50 conjointly with U-shaped bracket 14.

The amount of the foregoing horizontal oscillation of U-shaped bracket 14 about the axis of shaft 50 depends upon the respective lengths of the crank 66, 68 and crank arm 46, and in the preferred embodiment being described the total horizontal oscillating motion is 30 degrees. It is preferred that in the intermediate position the reflectors 20 and 22 be directed forwardly as shown in solid lines in FIG. 1. Accordingly, in the preferred embodiment the reflectors oscillate back and forth approximately 15 degrees left and 15 degrees right of the forward position of the reflectors shown in solid lines in FIG. 1. The left and right horizontal positions of reflectors 20 and 22 are shown by the dash lines in FIG. 1. It is within the scope of the present invention to vary the amplitude of horizontal oscillation by varying the above-described crank linkage geometry.

As previously described, the light assembly of the present invention includes a pair of light sources comprising lamp 16 and reflector 20, and lamp 18 and reflector 22. A bayonet type lamp socket 72 (see FIG. 2) is fixedly mounted on the upright plate portion 34 of U-shaped bracket 14, and the lamp 16 is held therein against a compressed spring 74 by a conventional bayonet connection. In a similar fashion, a bayonet lamp socket 76 is fixedly mounted on the upright plate portion 36 of the U-shaped bracket 14, and the lamp 18 is held therein against a compressed spring 78 by a conventional bayonet connection. Thus, the two lamps 16 and 18 are fixed relative to U-shaped bracket 14 and oscillate back and forth horizontally with that bracket as represented by the reflector positions illustrated in dash lines in FIG. 1.

Figure 2:
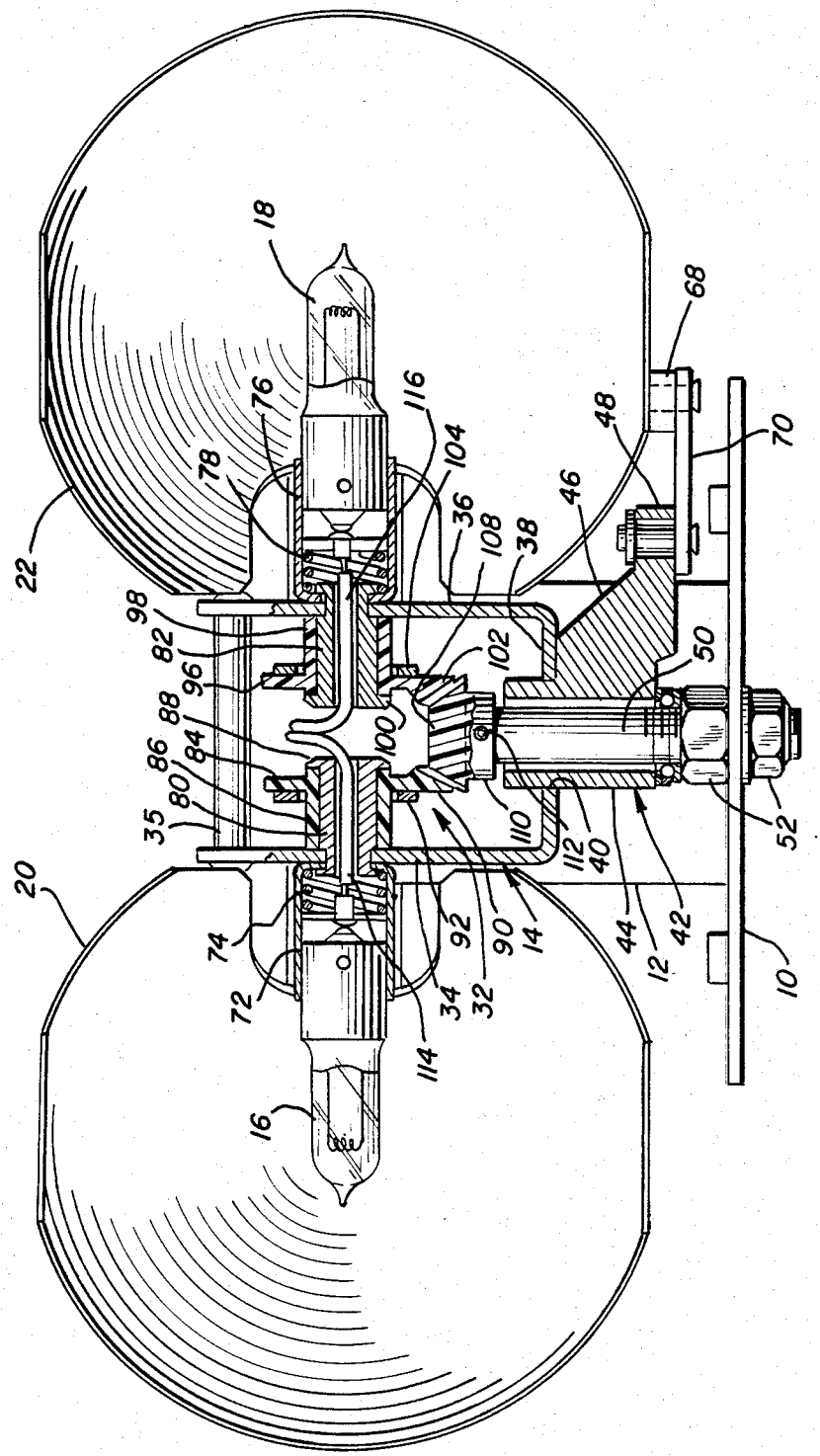
FIG. 2 is a vertical sectional view taken substantially along the line 2—2 of FIG. 1.

In accordnace with the preferred embodiment of the present invention, the reflectors 20 and 22 also oscillate up and down about a horizontal axis relative to the lamps 16 and 18, while the latter oscillate horizontally with the bracket 14 but do not oscillate vertically. As best shown in FIG. 2, a stub shaft 80 is crimped or otherwise fixedly supported in a horizontal position from the upright plate portion 34 so as to project inwardly therefrom, and a similar stub shaft 82 is mounted from the opposite plate portion 36. A plastic gear member 84 having an integral mounting sleeve 86 is mounted on stub shaft 80, the plastic sleeve 86 being positioned on the shaft 80 and retained thereon by a flange 88 formed on the inner end of the shaft. The sleeve 86 is loosely mounted on the shaft 80 so it is free to rotate thereon under the control of a beveled gear segment 90 formed on gear 84.

A reflector mounting bracket best shown in FIG. 1 comprises a plate portion 92 which is parallel to the gear 84 and riveted or otherwise affixed thereto, and a transverse plate portion 94 having a curved and portion 95 to which reflector 20 is riveted or otherwise affixed. It will thus be understood that oscillation of beveled gear segment 90 back and forth about the horizontal axis of stub shaft 80 will cause reflector 20 to oscillate up and down about that same horizontal axis as best shown in FIG. 3.

In a similar manner, a plastic gear member 96 having an integral mounting sleeve 98 is mounted on stub shaft 82, the plastic sleeve 98 being positioned on the shaft 82 and retained thereon by a flange 100 formed on the inner end of the shaft. The sleeve 98 is loosely mounted on shaft 82 so it is free to rotate thereon under the control of a beveled gear segment 102 formed on gear 96. A reflector mounting bracket best shown in FIG. 1 comprises a plate portion 104 parallel to gear 96 and riveted or otherwise affixed thereto, and a transverse plate portion 106 having a curved end 107 to which reflector 22 is riveted or otherwise affixed. It will thus be understood that oscillation of beveled gear segment 102 back and forth about the horizontal axis of stub shaft 82 will cause reflector 22 to oscillate up and down about that same horizontal axis as shown in FIG. 3.

Vertical oscillation of the reflectors 20 and 22 is controlled by a third stationary bevel gear 108 which is fixedly mounted at the upper end of shaft 50 as shown in FIG. 2. The bevel gear 108 is plastic and has an integral sleeve 110 which mounts on the upper end of shaft 50 and is held in position by a set screw 112. The foregoing arrangement is quite advantageous as it simplifies the assembly and minimizes tolerance problems. The third gear 108 may readily be adjusted vertically so that it meshes properly with the two bevel gear segments 90 and 102.

It will now be understood that with the above-described assembly of the gear segments 90 and 102 and stationary bevel gear 108, vertical oscillation of the reflectors 20 and 22 is effected automatically during the horizontal oscillation of U-shaped bracket 14. Thus, as U-shaped bracket 14 oscillates horizontally back and forth through its 30 degree range as described above, gear segments 90 and 102 are caused to move around stationary bevel gear 108, thereby causing limited rotation of gear members 84 and 96 back and forth about the horizontal axis of stub shafts 80 and 82. Since reflectors 20 and 22 are mounted on brackets 92, 94 and 104, 106 which are affixed to the beveled plastic gears 84, 90 and 96, 102, respectively, reflectors 20 and 22 will oscillate vertically about the horizontal axis of shafts 80 and 82 as U-shaped bracket oscillates horizontally.

The gear ratio between the beveled gear segments 90 and 102 and fixed bevel gear 108 will determine the amplitude of the vertical oscillation. In the preferred embodiment described herein, the gear ratio is 2:1, meaning the diameter of the gear segments 90 and 102 is two times the diameter of the fixed bevel gear 108. Such a gear ratio produces a vertical oscillation of 15 degrees. The preferred intermediate position is that shown in solid lines in FIG. 3 so as to produce an approximately horizontal light beam, and the reflectors 20 and 22 are tilted 7½ degrees above and below that intermediate position as illustrated by the dash lines in FIG. 3. Such an amplitude of vertical oscillation can readily be increased by reducing the foregoing gear ratio, or it may be reduced by increasing the gear ratio.

The electrical leads for the lamps 16 and 18 may be brought in through the interior of the stub shafts 80 and 82 as shown at 114 and 116 in FIG. 2. Lamps 16 and 18 may be incandescent or halogen lamps as desired. Because each light source oscillates both horizontally and vertically, each such source produces a diagonal sweep of light. The two light sources together thereby produce an X-pattern of light which has been found unusually effective for purposes of clearing the right-of-way for an emergency vehicle such as a police car, fire truck or ambulance.

A twin oscillating light constructed in accordance with the present invention may be mounted on an emergency vehicle in various ways, but it will normally be aimed forwardly for the purpose of clearing the right-of-way. It may simply be mounted in its own housing on the roof of a vehicle. In another embodiment, it may be mounted substantially flush as at the front of a fire truck between the conventional headlights. In still another embodiment, the twin oscillating light of the present invention may be mounted centrally in the housing of a light bar of the type which extends transversely across the roof of an emergency vehicle, such as in the light bar described in U.S. Pat. No. 4,240,062 which is assigned to the assignee of the present invention.

The X-pattern light produced by the twin oscillating light assembly of the present invention has been found to constitute a significant improvement over previously known oscillating lights which include only a single lamp and generally produce what is referred to as a figure eight light pattern. The improved X-pattern light is exceptionally effective in gaining the attention of nearby motorists by flashing in their mirrors and apprising them of the presence of an oncoming emergency vehicle so they clear the right-of-way for such vehicle.

The mechanism of the present invention for producing the X-pattern light is also quite advantageous, especially for the reason that it is a simple matter to vary the amplitude of the vertical light sweep by simply varying the gear ratio between the bevel gear segments 90 and 102 and the stationary bevel gear 108. It is also a simple matter to vary the amplitude of the horizontal light sweep by varying the linkage geometry of the cranking mechanism comprising the crank 66, 68 and the crank member 42 which are interconnected by link 70.

What is claimed is:

1. A twin oscillating light assembly for use on emergency vehicles and the like comprising, in combination, a pair of light sources each mounted on a bracket, each bracket being carried by separate beveled gear means, said beveled gear means being each carried in engaged relation at opposite sides of a fixed beveled gear carried on a vertical shaft, and means for horizontally rotating said light sources back and forth along an arc about said fixed shaft, whereby upon said horizontal rotation the respective beveled gear means to which each light source is attached cause the respective light source to rotate back and forth about a vertical arc in out of phase relation with the other light source, to produce an approximate X-pattern of light movement.

2. A twin oscillating light assembly for use on emergency vehicles and the like comprising, in combination, a first light source mounted for oscillating movement about first and second axes to produce a first generally linear light path, a second light source mounted for oscillating movement about first and second axes to produce a second generally linear light path, said first and second light sources being arranged so said first and second light paths cross to produce an approximate X-pattern of light, and motor means for oscillating said first and second light sources.

3. A twin oscillating light assembly for use on emergency vehicles and the like comprising, in combination, a light mounting member for oscillating movement about a first axis, a first light source mounted on said mounting member for oscillating movement relative thereto about a second axis, a second light source mounted on said mounting member for oscillating movement relative thereto about said second axis in out-of-phase relation to said first light source, said first and second light sources being oscillated about said second axis simultaneously with oscillation of said mounting member about said first axis, first drive means for oscillating said mounting member about said first axis, and second drive means for oscillating said first and second light sources relative to said mounting member about said second axis.

4. A twin oscillating light assembly for use on emergency vehicles and the like comprising, in combination, a light mounting member mounted for oscillating movement about a first generally vertical axis, a first light source mounted on said mounting member for oscillating movement relative thereto about a second generally horizontal axis, a second light source mounted on said mounting member for oscillating movement relative thereto about said generally horizontal axis in out-of-phase relation to said first light source so one of said light sources moves generally upwardly while the other moves generally downwardly relative to said mounting member during oscillation of said mounting member about said generally vertical axis, first drive means for oscillating said mounting member about said generally vertical axis, and second drive means for oscillating said light sources relative to said mounting member about said generally horizontal axis.

5. A twin oscillating light assembly for use on emergency vehicles and the like comprising, in combination, a light mounting member for oscillating movement about a first axis, a first light source mounted on said mounting member for oscillating movement relative thereto about a second axis, a second light source mounted on said mounting member for oscillating movement relative thereto about said second axis in out-of-phase relation to said first light source, said first and second light sources being oscillated about said second axis simultaneously with oscillation of said mounting member about said first axis, motor means and crank linkage means connected to said mounting member for oscillating the same back and forth about said first axis, and multiple gear means connected to said first and second light sources for oscillating the same relative to said mounting member about said second axis.

6. A twin oscillating light assembly as defined in claim 5 where said first axis is approximatley vertical and said second axis is approximately horizontal.

7. A twin oscillating light assembly as defined in claim 6 where said first and second light sources are mounted in side-by-side relation on said mounting means.

8. A twin oscillating light assembly as defined in claim 7 where said first and second light sources oscillate with said mounting member about said approximately vertical axis so as to sweep horizontally left and right of a straight ahead position, and said first and second light sources also oscillate vertically about said approximately horizontal axis so as to sweep above and below a horizontal position.

9. A twin oscillating light assembly for use on emergency vehicles and the like comprising, in combination, a light mounting member mounted for oscillating movement about a generally vertical axis, a first light source mounted on said mounting member for oscillating movement relative thereto about a generally horizontal axis, a second light source mounted on said mounting member in side-by-side relation to said first light source for oscillating movement relative to said mounting member about said generally horizontal axis in out-of-phase relation to said first light source, said first and second light sources being oscillated about said generally horizontal axis simultaneously with oscillation of said mounting member about said generally vertical axis, motor means and crank linkage means connected to said mounting member for oscillating the same back and forth about said generally vertical axis, and multiple gear means connected to said first and second light sources for oscillating the same relative to said mounting member about said generally horizontal axis, each of said light sources including a lamp fixed relative to said mounting member and a reflector which oscillates up and down relative to said mounting member about said generally horizontal axis.

10. A twin oscillating light assembly as defined in claim 9 where said gear means includes a first gear connected to a first reflector associated with said first light source, a second gear connected to a second reflector associated with said second light source, and a third gear fixed relative to said mounting member, said third gear being connected to both said first and second gears to produce out-of-phase oscillation thereof during oscillation of said mounting means.

* * * * *